(12) United States Patent
Angadjivand et al.

(10) Patent No.: US 8,029,723 B2
(45) Date of Patent: Oct. 4, 2011

(54) METHOD FOR MAKING SHAPED FILTRATION ARTICLES

(75) Inventors: Seyed A. Angadjivand, Woodbury, MN (US); Marvin E. Jones, Grant, MN (US); James E. Springett, Webster, WI (US); John M. Brandner, St. Paul, MN (US); Timothy J. Lindquist, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 345 days.

(21) Appl. No.: 12/375,494

(22) PCT Filed: Jul. 17, 2007

(86) PCT No.: PCT/US2007/073648
§ 371 (c)(1),
(2), (4) Date: Jan. 28, 2009

(87) PCT Pub. No.: WO2008/085545
PCT Pub. Date: Jul. 17, 2008

(65) Prior Publication Data
US 2009/0315224 A1      Dec. 24, 2009

(51) Int. Cl.
*D01D 5/098*   (2006.01)
*D04H 3/03*    (2006.01)
*D04H 3/16*    (2006.01)
*D06M 10/02*   (2006.01)
*H05B 7/00*    (2006.01)

(52) U.S. Cl. ........ 264/469; 156/167; 156/181; 264/103; 264/210.2; 264/555

(58) Field of Classification Search .................. 264/103, 264/210.2, 466, 469, 555; 156/167, 181
See application file for complete search history.

(56) References Cited

U.S. PATENT DOCUMENTS

| | | | |
|---|---|---|---|
| 2,007,867 A | 7/1935 | Le Duc |
| 2,265,529 A | 12/1941 | Kemp |
| 2,565,124 A | 12/1951 | Durborow |
| 2,634,724 A | 4/1953 | Burns |
| 2,752,916 A | 7/1956 | Haliczer |
| RE24,549 E | 10/1958 | Haliczer |
| 3,073,735 A | 1/1963 | Till et al. |
| 3,664,335 A | 5/1972 | Boucher et al. |
| 3,736,928 A | 6/1973 | Andersson et al. |
| 3,971,369 A | 7/1976 | Aspelin et al. |

(Continued)

FOREIGN PATENT DOCUMENTS

CA      2647800      11/2007

(Continued)

*Primary Examiner* — Leo B Tentoni
(74) *Attorney, Agent, or Firm* — Kenneth B. Wood

(57) ABSTRACT

Shaped filtration articles are made from a monocomponent nonwoven web formed by flowing first and second fiber-forming materials of the same polymeric composition through first and second die cavities in respective fluid communication with first and second sets of orifices in a melt-blowing die tip. The first fiber-forming material flows at a lesser flow rate or viscosity through the first die cavity and first set of orifices to form a set of smaller size filaments and the second fiber-forming material flows at a greater flow rate or viscosity through the second die cavity and second set of orifices to form a set of larger size filaments. The collected nonwoven web contains a meltblown bimodal mass fraction/fiber size mixture of intermingled continuous microfibers and larger size fibers of the same polymeric composition.

21 Claims, 5 Drawing Sheets

U.S. PATENT DOCUMENTS

| | | |
|---|---|---|
| 3,981,650 A | 9/1976 | Page |
| 4,100,324 A | 7/1978 | Anderson |
| 4,118,531 A | 10/1978 | Hauser |
| 4,248,220 A | 2/1981 | White |
| 4,300,549 A | 11/1981 | Parker |
| 4,405,297 A | 9/1983 | Appel et al. |
| 4,417,575 A | 11/1983 | Hilton et al. |
| 4,419,993 A | 12/1983 | Peterson |
| 4,419,994 A | 12/1983 | Hilton |
| 4,536,361 A | 8/1985 | Torobin |
| 4,536,440 A | 8/1985 | Berg |
| 4,547,420 A | 10/1985 | Krueger et al. |
| 4,588,537 A | 5/1986 | Klasse et al. |
| 4,600,002 A | 7/1986 | Maryyanek et al. |
| 4,714,647 A | 12/1987 | Shipp, Jr. et al. |
| 4,729,371 A | 3/1988 | Krueger et al. |
| 4,807,619 A | 2/1989 | Dyrud |
| 4,818,464 A | 4/1989 | Lau |
| 4,883,547 A | 11/1989 | Japuntich |
| 4,920,960 A | 5/1990 | Hubbard et al. |
| 4,931,355 A | 6/1990 | Radwanski et al. |
| 4,988,560 A | 1/1991 | Meyer et al. |
| 5,079,080 A | 1/1992 | Schwarz |
| 5,227,107 A | 7/1993 | Dickenson et al. |
| 5,322,061 A | 6/1994 | Brunson |
| 5,382,400 A | 1/1995 | Pike et al. |
| 5,476,616 A | 12/1995 | Schwarz |
| 5,480,466 A | 1/1996 | Jackson |
| 5,496,507 A | 3/1996 | Angadjivand |
| 5,582,907 A | 12/1996 | Pall |
| 5,679,042 A | 10/1997 | Varona |
| 5,679,379 A | 10/1997 | Fabbricante et al. |
| 5,681,469 A | 10/1997 | Barboza et al. |
| 5,685,757 A | 11/1997 | Kirsch et al. |
| 5,695,376 A | 12/1997 | Datta et al. |
| 5,701,892 A | 12/1997 | Bledstein |
| 5,707,468 A | 1/1998 | Arnold et al. |
| 5,709,735 A * | 1/1998 | Midkiff et al. ............. 96/17 |
| 5,717,991 A | 2/1998 | Nozaki et al. |
| 5,721,180 A | 2/1998 | Pike et al. |
| 5,724,964 A | 3/1998 | Brunson et al. |
| 5,735,270 A | 4/1998 | Bayer |
| 5,783,011 A * | 7/1998 | Barboza et al. ............. 156/167 |
| 5,817,584 A | 10/1998 | Singer et al. |
| 5,877,098 A | 3/1999 | Tanaka et al. |
| 5,902,540 A | 5/1999 | Kwok |
| 5,904,298 A | 5/1999 | Kwok et al. |
| 5,908,598 A | 6/1999 | Rousseau et al. |
| 5,993,543 A | 11/1999 | Aoki et al. |
| 5,993,943 A | 11/1999 | Bodaghi et al. |
| 6,041,782 A | 3/2000 | Angadjivand et al. |
| 6,123,077 A | 9/2000 | Bostock et al. |
| 6,176,955 B1 | 1/2001 | Haynes et al. |
| 6,183,670 B1 | 2/2001 | Torobin et al. |
| 6,217,691 B1 | 4/2001 | Vair, Jr. et al. |
| 6,230,901 B1 | 5/2001 | Ogata et al. |
| 6,269,513 B1 | 8/2001 | Torobin |
| 6,274,238 B1 | 8/2001 | DeLucia |
| 6,315,806 B1 | 11/2001 | Torobin et al. |
| 6,319,865 B1 | 11/2001 | Mikami |
| 6,358,592 B2 | 3/2002 | Vair, Jr. et al. |
| 6,394,090 B1 | 5/2002 | Chen et al. |
| 6,397,458 B1 | 6/2002 | Jones et al. |
| 6,398,847 B1 | 6/2002 | Jones et al. |
| 6,409,806 B1 | 6/2002 | Jones et al. |
| 6,474,336 B1 | 11/2002 | Wolfe |
| 6,485,811 B1 | 11/2002 | Horiguchi et al. |
| 6,548,431 B1 | 4/2003 | Bansal |
| 6,562,112 B2 | 5/2003 | Jones et al. |
| 6,607,624 B2 | 8/2003 | Berrigan et al. |
| 6,660,210 B2 | 12/2003 | Jones et al. |
| 6,667,254 B1 | 12/2003 | Thompson et al. |
| 6,723,669 B1 | 4/2004 | Clark et al. |
| 6,827,764 B2 | 12/2004 | Springett et al. |
| 6,858,297 B1 | 2/2005 | Shah et al. |
| 6,916,752 B2 | 7/2005 | Berrigan et al. |
| 6,998,164 B2 | 2/2006 | Neely et al. |
| 2003/0134515 A1 | 7/2003 | David et al. |
| 2003/0162457 A1 | 8/2003 | Berrigan et al. |
| 2004/0097155 A1 | 5/2004 | Olson et al. |
| 2005/0217226 A1 | 10/2005 | Sundet et al. |
| 2006/0005518 A1 * | 1/2006 | Duffy et al. ............. 55/497 |

FOREIGN PATENT DOCUMENTS

| | | |
|---|---|---|
| EP | 0 322 136 B1 | 2/1994 |
| EP | 0665315 A1 | 8/1995 |
| EP | 799342 | 9/1999 |
| GB | 2 103 491 A | 2/1983 |
| JP | 06-207359 A | 7/1994 |
| JP | 2001-049560 | 2/2001 |
| JP | 2002-180331 | 6/2002 |
| JP | 2002-348737 | 12/2002 |
| JP | 2007-054778 | 3/2007 |
| KR | 10-1995-0023751 A | 8/1995 |
| KR | 10-2002-0061648 A | 7/2002 |
| WO | WO 97/37071 A1 | 10/1997 |
| WO | WO 02/46504 | 6/2002 |
| WO | WO-2004011123 A2 * | 2/2004 |
| WO | WO 2007/112877 | 10/2007 |

* cited by examiner

METHOD FOR MAKING SHAPED FILTRATION ARTICLES

CROSS REFERENCE TO RELATED APPLICATIONS

This application is a national stage filing under 35 U.S.C. 371 of PCT/US2007/073648, filed Jul. 17, 2007, which claims priority to U.S. patent application Ser. No. 11/693017, filed Mar. 29, 2007, now abandoned; Ser. No. 11/461,145, filed Jul. 31, 2006, now issued as U.S. Pat. No. 7,858,163; and Ser. No. 11/461,307, filed Jul. 31, 2006, now issued as U.S. Pat. No. 7,754,041; the disclosures of which are incorporated by reference in their entirety herein.

BACKGROUND

Patents or applications relating to nonwoven webs, their manufacture and articles made therefrom include U.S. Pat. No. 3,981,650 (Page), U.S. Pat. No. 4,100,324 (Anderson), U.S. Pat. No. 4,118,531 (Hauser), U.S. Pat. No. 4,536,440 (Berg), U.S. Pat. No. 4,547,420 (Krueger et al.), U.S. Pat. No. 4,818,464 (Lau), U.S. Pat. No. 4,931,355 (Radwanski et al.), U.S. Pat. No. 4,988,560 (Meyer et al.), U.S. Pat. No. 5,227,107 (Dickenson et al.), U.S. Pat. No. 5,374,458 (Burgio) U.S. Pat. No. 5,382,400 (Pike et al. '400), U.S. Pat. No. 5,476,616 (Schwarz), U.S. Pat. No. 5,679,042 (Varona), U.S. Pat. No. 5,679,379 (Fabbricante et al.), U.S. Pat. No. 5,695,376 (Datta et al.), U.S. Pat. No. 5,707,468 (Arnold et al.), U.S. Pat. No. 5,721,180 (Pike et al. '180), U.S. Pat. No. 5,817,584 (Singer et al.), U.S. Pat. No. 5,877,098 (Tanaka et al.), U.S. Pat. No. 5,902,540 (Kwok), U.S. Pat. No. 5,904,298 (Kwok et al.), U.S. Pat. No. 5,993,543 (Bodaghi et al.), U.S. Pat. No. 6,176,955 B1 (Haynes et al.), U.S. Pat. No. 6,183,670 B1 (Torobin et al.), U.S. Pat. No. 6,319,865 B1 (Mikami), U.S. Pat. No. 6,607,624 B2 (Berrigan et al. '624), U.S. Pat. No. 6,667,254 B1 (Thompson et al.), U.S. Pat. No. 6,723,669 (Clark et al.), U.S. Pat. No. 6,827,764 B2 (Springett et al.), U.S. Pat. No. 6,858,297 B1 (Shah et al.), U.S. Pat. No. 6,916,752 B2 (Berrigan et al. '752) and U.S. Pat. No. 6,998,164 B2 (Neely et al.); European Patent No. EP 0 322 136 B1 (Minnesota Mining and Manufacturing Co.); Japanese published application Nos. JP 2001-049560 (Nissan Motor Co. Ltd.), JP 2002-180331 (Chisso Corp. '331) and JP 2002-348737 (Chisso Corp. '737); and U.S. Patent Application Publication Nos. US2004/0097155 A1 (Olson et al.) and US2005/0217226 A1 (Sundet et al. '226).

SUMMARY OF THE INVENTION

Shaped filtration articles such as molded respirators or pleated furnace filters are sometimes made using nonwoven webs made from multicomponent (e.g., bicomponent) fibers. FIG. 1a through FIG. 1e depict five popular bicomponent fiber configurations, which may be referred to respectively as "2-layer" or "side-by-side" (FIG. 1a), "islands in the sea" (FIG. 1b), "solid segmented pie" (FIG. 1c), "hollow segmented pie" (FIG. 1d) and "sheath-core" (FIG. 1e). The use of two or more polymers in a multicomponent fiber limits the extent to which unused portions of the multicomponent fiber web or article may be recycled, and if only one polymer is electret chargeable may limit the extent to which charge may be applied.

Shaped filtration articles may also be formed by adding an extraneous bonding material (e.g., an adhesive) to a filtration web, with consequent limitations due to the chemical or physical nature of the added bonding material including added web basis weight and loss of recyclability.

Existing methods for manufacturing shaped filtration articles such as molded respirators or pleated furnace filters generally involve some compromise of web or article properties and one or more of the disadvantages mentioned above.

The present invention provides, in one aspect, a method for making shaped filtration articles, which method comprises:
  a) forming a monocomponent nonwoven web by:
    i) flowing first and second fiber-forming materials of the same polymeric composition through a meltblowing die comprising first and second die cavities in respective fluid communication with first and second sets of orifices in a meltblowing die tip, wherein the first fiber-forming material flows at a lesser flow rate or viscosity through the first die cavity and first set of orifices to form a set of smaller size filaments and the second fiber-forming material flows at a greater flow rate or viscosity through the second die cavity and second set of orifices to form a set of larger size filaments;
    ii) comingling the smaller size and larger size filaments while attenuating them into fibers between converging streams of air or other fluid;
    iii) collecting the attenuated fibers as a nonwoven web containing a meltblown bimodal mass fraction/fiber size mixture of intermingled continuous microfibers and larger size fibers of the same polymeric composition, and
  b) molding, pleating or otherwise shaping the web into a self-supporting non-planar porous monocomponent monolayer matrix of fibers bonded to one another at least some points of fiber intersection.

In one exemplary embodiment the first and second set of orifices are in a row. In another exemplary embodiment the web has a Gurley Stiffness of at least about 100 mg before shaping. In yet another exemplary embodiment the web has a King Stiffness greater than 1 N after shaping.

The disclosed method has a number of beneficial and unique properties. By forming the smaller and larger size filaments at a common die tip and comingling the filaments between converging streams of air or other fluid, a web with well-mixed fibers can be obtained. Both the larger size fibers and the microfibers may be highly charged. The larger size fibers can impart improved moldability and improved stiffness to a molded or shaped matrix made from the disclosed web. The microfibers can impart increased fiber surface area to the web, with beneficial effects such as improved filtration performance. By using microfibers and larger size fibers of different sizes, filtration and molding properties can be tailored to a particular use. And in contrast to the high pressure drop (and thus high breathing resistance) often characteristic of microfiber webs, pressure drops of the disclosed nonwoven webs are kept lower, because the larger fibers physically separate and space apart the microfibers. The microfibers and larger size fibers also appear to cooperate with one another to provide a higher particle depth loading capacity.

By using direct-web-formation manufacturing equipment, in which a fiber-forming polymeric material is converted into a web in one essentially direct operation, and by using a single polymeric resin, the disclosed nonwoven webs can be quite economically prepared. Also, if the microfibers and larger size fibers all have the same polymeric composition and extraneous bonding materials are not employed, unused portions of the disclosed nonwoven webs can be fully recycled.

These and other aspects of the invention will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWING

Like reference symbols in the various figures of the drawing indicate like elements. The elements in the drawing are not to scale.

DETAILED DESCRIPTION

Figure 1A:
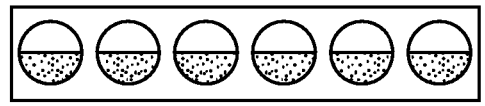
FIG. 1a through FIG. 1e respectively show cross-sectional schematic views of several bicomponent fiber configurations.
Figure 1B:
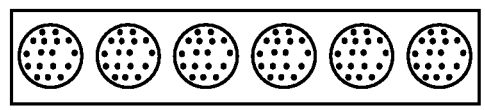
Figure 1C:
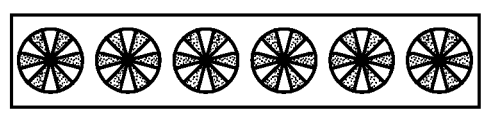
Figure 1D:
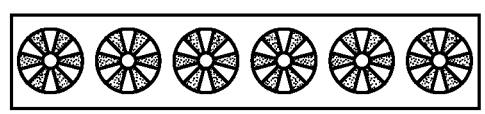
Figure 1E:
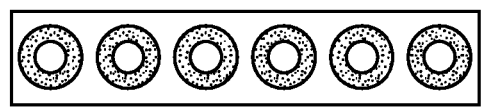

The term "porous" means air-permeable.

The term "monocomponent" when used with respect to a fiber or collection of fibers means fibers formed from one polymer only. This is not meant to exclude fibers formed from one polymer to which small amounts of additives have been added for purposes such as electret charging enhancement, antistatic properties, lubrication, hydrophilicity, coloration, etc. These additives, e.g. tristearyl melamine for charging enhancement, are generally present in an amount less than about 5 wt. % and more typically less than about 2 wt. %.

The term "of the same polymeric composition" means polymers that have essentially the same repeating molecular unit, but which may differ in molecular weight, melt index, method of manufacture, commercial form, etc., and which may optionally contain minor amounts (e.g., less than about 3 wt. %) of an electret charging additive.

The term "size" when used with respect to a filament or fiber means the filament or fiber diameter for a filament or fiber having a circular cross section, or the length of the longest cross-sectional chord that may be constructed across a filament or fiber having a non-circular cross-section.

The term "continuous" when used with respect to a fiber or collection of fibers means fibers having an essentially infinite aspect ratio (viz., a ratio of length to size of e.g., at least about 10,000 or more).

The term "Effective Fiber Diameter" when used with respect to a collection of fibers means the value determined according to the method set forth in Davies, C. N., "The Separation of Airborne Dust and Particles", Institution of Mechanical Engineers, London, Proceedings 1B, 1952 for a web of fibers of any cross-sectional shape be it circular or non-circular.

The term "mode" when used with respect to a histogram of mass fraction vs. fiber size in µm or a histogram of fiber count (frequency) vs. fiber size in µm means a local peak whose height is larger than that for fiber sizes 1 and 2 µm smaller and 1 and 2 µm larger than the local peak.

The term "bimodal mass fraction/fiber size mixture" means a collection of fibers having a histogram of mass fraction vs. fiber size in µm exhibiting at least two modes. A bimodal mass fraction/fiber size mixture may include more than two modes, for example it may be a trimodal or higher-modal mass fraction/fiber size mixture.

The term "bimodal fiber count/fiber size mixture" means a collection of fibers having a histogram of fiber count (frequency) vs. fiber size in µm exhibiting at least two modes whose corresponding fiber sizes differ by at least 50% of the smaller fiber size. A bimodal fiber count/fiber size mixture may include more than two modes, for example it may be a trimodal or higher-modal fiber count/fiber size mixture.

The term "nonwoven web" means a fibrous web characterized by entanglement or point bonding of the fibers.

The term "monolayer matrix" when used with respect to a nonwoven web containing a bimodal mass fraction/fiber size mixture of fibers means having (other than with respect to fiber size) a generally uniform distribution of similar fibers throughout a cross-section of the web, and having (with respect to fiber size) fibers representing each modal population present throughout a cross-section of the web. Such a monolayer matrix may have a generally uniform distribution of fiber sizes throughout a cross-section of the web or may, for example, have a depth gradient of fiber sizes such as a preponderance of larger size fibers proximate one major face of the web and a preponderance of microfibers proximate the other major face of the web.

The term "attenuating the filaments into fibers" means the conversion of a segment of a filament into a segment of greater length and smaller size.

The term "meltblown" when used with respect to a nonwoven web means a web formed by extruding a fiber-forming material through a plurality of orifices to form filaments while contacting the filaments with air or other attenuating fluid to attenuate the filaments into fibers and thereafter collecting a layer of the attenuated fibers.

The term "meltblown fibers" means fibers prepared by extruding molten fiber-forming material through orifices in a die into a high-velocity gaseous stream (e.g., a single stream or a plurality of converging streams), where the extruded material is first attenuated and then solidifies as a mass of fibers. Although meltblown fibers have sometimes been reported to be discontinuous, the fibers generally are long and entangled sufficiently that it is usually not possible to remove one complete meltblown fiber from a mass of such fibers or to trace one meltblown fiber from beginning to end.

The term "meltblowing die" means a die for use in a meltblowing process.

The term "microfibers" means fibers having a median size (as determined using microscopy) of 10 µm or less; "ultrafine microfibers" means microfibers having a median size of two µm or less; and "submicron microfibers" means microfibers having a median size one µm or less. When reference is made herein to a batch, group, array, etc. of a particular kind of microfiber, e.g., "an array of submicron microfibers," it means the complete population of microfibers in that array, or the complete population of a single batch of microfibers, and not only that portion of the array or batch that is of submicron dimensions.

The term "charged" when used with respect to a collection of fibers means fibers that exhibit at least a 50% loss in Quality Factor QF (discussed below) after being exposed to a 20 Gray absorbed dose of 1 mm beryllium-filtered 80 KVp X-rays when evaluated for percent dioctyl phthalate (% DOP) penetration at a face velocity of 7 cm/sec.

The term "self-supporting" means an article having sufficient coherency and strength so as to be handleable using reel-to-reel manufacturing equipment without substantial tearing or rupture.

Figure 2:
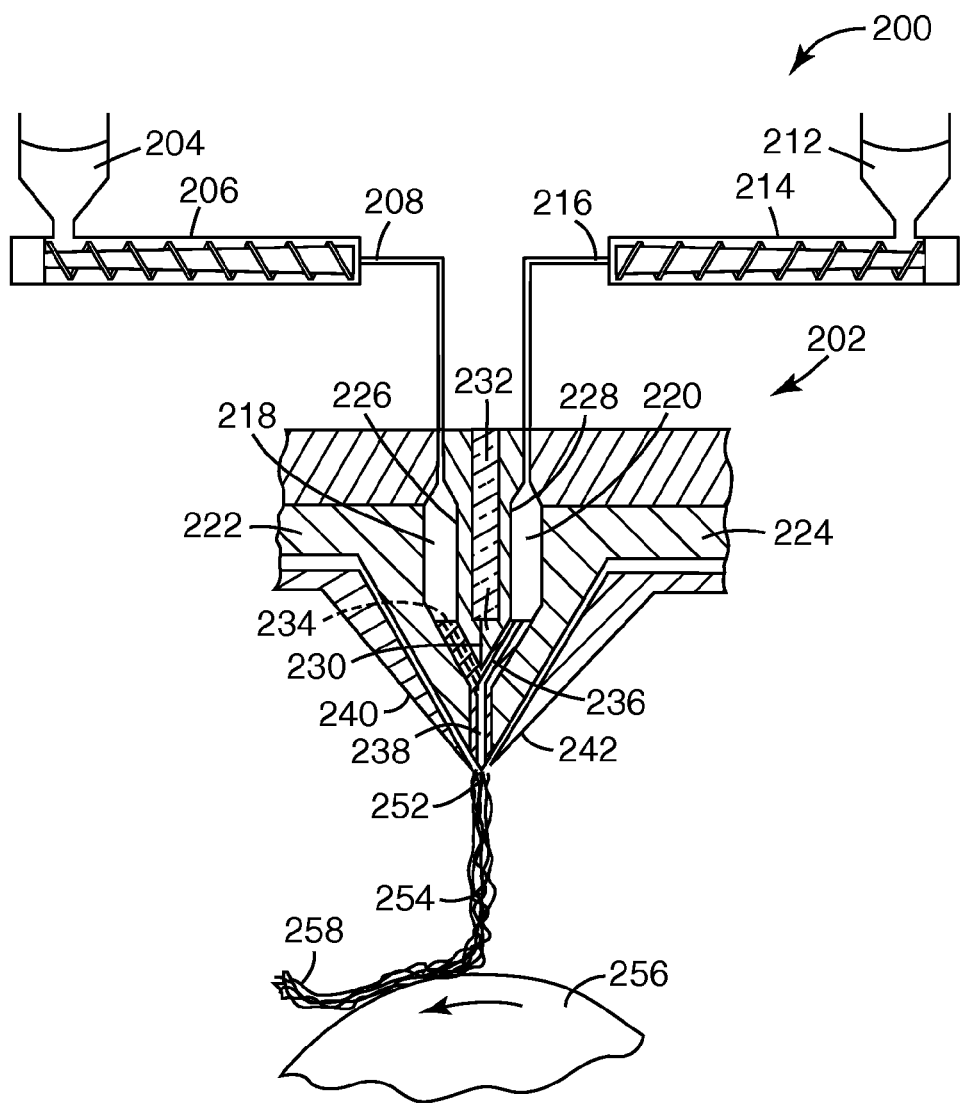
FIG. 2 is a schematic cross-sectional view.
Figure 3:
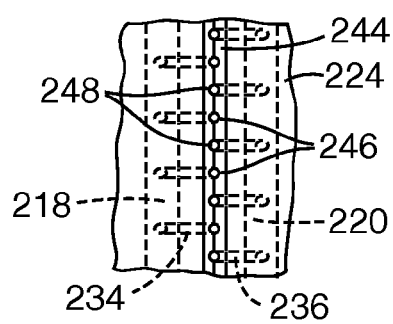
FIG. 3 is an outlet end view of an exemplary meltblowing die having a row of orifices supplied with polymers of the same polymeric composition flowing at different rates or with different viscosities.

FIG. 2 and FIG. 3 illustrate an apparatus 200 for making a porous monocomponent nonwoven web containing a bimodal fiber count/fiber size mixture of intermingled continuous microfibers and larger size fibers of the same polymeric composition. Meltblowing die 202 is supplied with a first liquefied fiber-forming material fed from hopper 204, extruder 206 and conduit 208 at a first flow rate or first viscosity. Die 202 is separately supplied with a second liquefied fiber-forming material of the same polymeric composition fed from hopper 212, extruder 214 and conduit 216 at a second, different flow rate or viscosity. The conduits 208 and 216 are in respective fluid communication with first and second die cavities 218 and 220 located in first and second generally symmetrical parts 222 and 224 which form outer walls for die cavities 218 and 220. First and second generally symmetrical parts 226 and 228 form inner walls for die cavities 218 and 220 and meet at seam 230. Parts 226 and 228 may be separated along most of their length by insulation 232. Deflector plates 240 and 242 direct streams of attenuating fluid (e.g., heated air) so that they converge on an array of filaments 252 issuing from meltblowing die 202 and attenuate the filaments 252 into fibers 254. The fibers 254 land against porous collector 256 and form a self-supporting nonwoven meltblown web 258.

FIG. 3 shows meltblowing die 202 in outlet end perspective view, with the attenuating gas deflector plates 240 and 242 removed. Parts 222 and 224 meet along seam 244 in which is located a first set of orifices 246 and a second set of orifices 248 and through which the array of filaments 252 will emerge. Die cavities 218 and 220 are in respective fluid communication via passages 234, 236 and 238 with the first set of orifices 246 and second set of orifices 248.

The apparatus shown in FIG. 2 and FIG. 3 may be operated in several modes or modified in several ways to provide a stream of larger size fibers issuing from one die cavity and smaller size fibers issuing from the other die cavity and thereby form a nonwoven web containing a bimodal mass fraction/fiber size mixture of intermingled larger size fibers and smaller size fibers of the same polymeric composition. For example, an identical polymer may be supplied from extruder 206 to die cavity 218 and from extruder 214 to die cavity 220, with extruder 214 providing a greater polymer flow rate (e.g., through the use of a larger diameter extruder barrel or higher rotational speed) or operating at a lower temperature than extruder 206 so as to supply the polymer at a lesser flow rate or viscosity into die cavity 218 and a greater flow rate or viscosity into die cavity 220 and produce smaller size fibers from orifices 246 and larger size fibers from orifices 248. Die cavity 218 may be operated at a high temperature and die cavity 220 may be operated at a low temperature so as to produce smaller size fibers from orifices 246 and larger size fibers from orifices 248. Polymers of the same polymeric composition but different melt indices may be supplied from extruder 206 to die cavity 218 and from extruder 214 to die cavity 220 (using for example a high melt index version of the polymer in extruder 206 and a low melt index of the same polymer in extruder 214 so as to produce smaller size fibers from orifices 246 and larger size fibers from orifices 248). Those having ordinary skill in the art will appreciate that other techniques (e.g., the inclusion of a solvent in the stream of liquefied fiber-forming material flowing to die cavity 218, or the use of a shorter flow path through die cavity 218 and a longer flow path through die cavity 220) and combinations of such techniques and the various operating modes discussed above may also be employed.

For the embodiment shown in FIG. 3, the orifices 246 and 248 are arranged in alternating order in a single row across the outlet end of die 202, and in respective fluid communication in a 1:1 ratio with the die cavities 218 and 220. Other arrangements of the orifices and other ratios of the numbers of orifices 246 and 248 may be employed to provide nonwoven webs with altered fiber size distributions. For example, the orifices may be arranged in a plurality of rows (e.g., 2, 3, 4 or more rows) between the attenuating air outlets. Patterns other than rows may be employed if desired, e.g., randomly-located orifices. If arranged in a plurality of rows, each row may contain orifices from only one set or from both the first and second sets. The number of orifices in the first and second set may stand in a variety of ratios, e.g., 10:90, 20:80, 30:70, 40:60, 50:50, 60:40, 70:30, 80:20, 90:10 and other ratios depending on the desired web structure. When orifices from both the first and second set are arranged in a row or rows, the first and second set orifices need not alternate and instead may be arranged in any desired fashion, e.g., 1221, 1122211, 11112221111 and other arrangements depending on the desired web structure. The die tip may contain more than one set of orifices, e.g., first, second, third and if need be further sets of orifices in respective fluid communication with first, second, third and if need be further die cavities within the meltblowing die so as to obtain a web with a tri- or greater-modal distribution of fiber sizes.

The remaining portions of the associated meltblowing apparatus will be familiar to those having ordinary skill in the art. For example, further details regarding meltblowing may be found in Wente, Van A. "Superfine Thermoplastic Fibers," in Industrial Engineering Chemistry, Vol. 48, pages 1342 et seq. (1956), or in Report No. 4364 of the Naval Research Laboratories, published May 25, 1954, entitled "Manufacture of Superfine Organic Fibers" by Wente, V. A.; Boone, C. D.; and Fluharty, E. L.; and in U.S. Pat. No. 5,993,943 (Bodaghi et al.).

The disclosed monocomponent monolayer web contains a bimodal mass fraction/fiber size mixture of microfibers and larger size fibers. The microfibers may for example have a size range of about 0.1 to about 10 µm, about 0.1 to about 5 µm or about 0.1 to about 1 µm. The larger size fibers may for example have a size range of about 10 to about 70 µm, about 10 to about 50 µm or about 15 to about 50 µm. A histogram of mass fraction vs. fiber size in µm may for example have a microfiber mode of about 0.1 to about 10 µm, about 0.5 to about 8 µm or about 1 to about 5 µm, and a larger size fiber mode of about 10 to about 50 µm, about 10 to about 40 µm or about 12 to about 30 µm. The disclosed web may also have a bimodal fiber count/fiber size mixture whose histogram of fiber count (frequency) vs. fiber size in µm exhibits at least two modes whose corresponding fiber sizes differ by at least 50%, at least 100%, or at least 200% of the smaller fiber size. The microfibers may also for example provide at least 20% of the fibrous surface area of the web, at least 40% or at least 60%. The web may have a variety of Effective Fiber Diameter (EFD) values, for example an EFD of about 5 to about 40 µm, or of about 6 to about 35 µm. The web may also have a variety of basis weights, for example a basis weight of about 60 to about 300 grams/m$^2$ or about 80 to about 250 grams/m$^2$.

The disclosed nonwoven webs may have a random fiber arrangement and generally isotropic in-plane physical properties (e.g., tensile strength). In general such isotropic nonwoven webs are preferred for forming cup-shaped molded respirators. The webs may instead have an aligned fiber construction (e.g., one in which the fibers are aligned in the machine direction as described in U.S. Pat. No. 6,858,297 to Shah et al. and anisotropic in-plane physical properties. If such anisotropic nonwoven webs are employed to form pleated filters, the pleat rows may if desired be aligned with respect to one or more anisotropic properties of interest so as to reduce pleat deformation at high face velocities.

A variety of polymeric fiber-forming materials may be used in the disclosed method. The polymer may be essentially any thermoplastic fiber-forming material capable of providing a nonwoven web. For webs that will be charged the polymer may be essentially any thermoplastic fiber-forming material which will maintain satisfactory electret properties or charge separation. Preferred polymeric fiber-forming materials for chargeable webs are non-conductive resins having a volume resistivity of $10^{14}$ ohm-centimeters or greater at room temperature (22° C.). Preferably, the volume resistivity is about $10^{16}$ ohm-centimeters or greater. Resistivity of the polymeric fiber-forming material may be measured according to standardized test ASTM D 257-93. Polymeric fiber-forming materials for use in chargeable webs also preferably are substantially free from components such as antistatic agents that could significantly increase electrical conductivity or otherwise interfere with the fiber's ability to accept and hold electrostatic charges. Some examples of polymers which may be used in chargeable webs include thermoplastic polymers containing polyolefins such as polyethylene, polypropylene, polybutylene, poly(4-methyl-1-pentene) and cyclic olefin copolymers, and combinations of such polymers. Other polymers which may be used but which may be difficult to charge or which may lose charge rapidly include polycarbonates, block copolymers such as styrene-butadiene-styrene and styrene-isoprene-styrene block copolymers, polyesters such as polyethylene terephthalate, polyamides, polyurethanes, and other polymers that will be familiar to those skilled in the art. The fibers preferably are prepared from poly-4-methyl-1 pentene or polypropylene. Most preferably, the fibers are prepared from polypropylene homopolymer because of its ability to retain electric charge, particularly in moist environments.

Electric charge can be imparted to the disclosed nonwoven webs in a variety of ways. This may be carried out, for example, by contacting the web with water as disclosed in U.S. Pat. No. 5,496,507 to Angadjivand et al., corona-treating as disclosed in U.S. Pat. No. 4,588,537 to Klasse et al., hydrocharging as disclosed, for example, in U.S. Pat. No. 5,908,598 to Rousseau et al., plasma treating as disclosed in U.S. Pat. No. 6,562,112 B2 to Jones et al. and U.S. Patent Application Publication No. US2003/0134515 A1 to David et al., or combinations thereof.

Additives may be added to the polymer to enhance the web's filtration performance, electret charging capability, mechanical properties, aging properties, coloration, surface properties or other characteristics of interest. Representative additives include fillers, nucleating agents (e.g., MILLAD™ 3988 dibenzylidene sorbitol, commercially available from Milliken Chemical), electret charging enhancement additives (e.g., tristearyl melamine, and various light stabilizers such as CHIMASSORB™ 119 and CHIMASSORB 944 from Ciba Specialty Chemicals), cure initiators, stiffening agents (e.g., poly(4-methyl-1-pentene)), surface active agents and surface treatments (e.g., fluorine atom treatments to improve filtration performance in an oily mist environment as described in U.S. Pat. Nos. 6,398,847 B1, 6,397,458 B1, and 6,409,806 B1 to Jones et al.). The types and amounts of such additives will be familiar to those skilled in the art.

Figure 4:
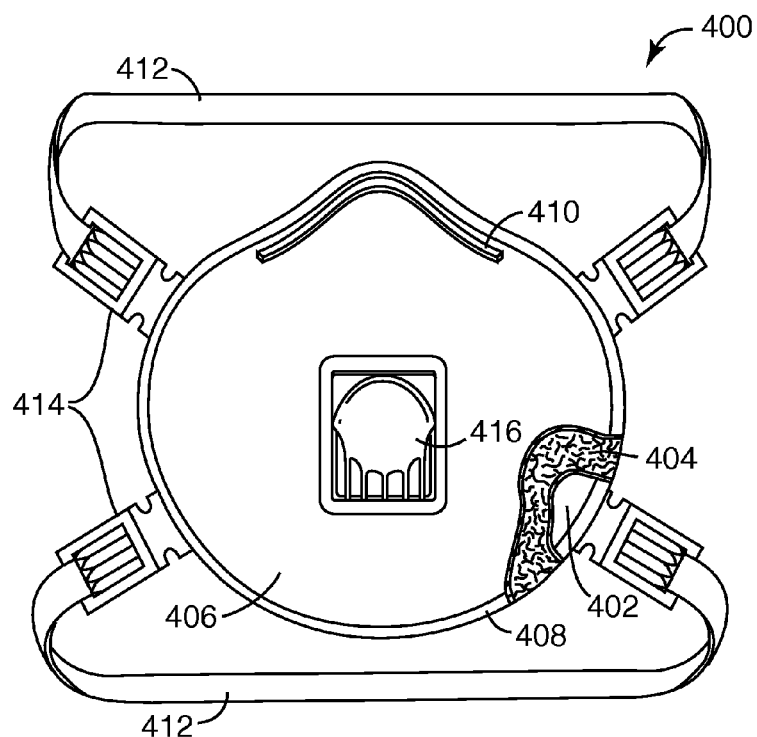
FIG. 4 is a perspective view, partially in section, of a disposable personal respirator having a deformation-resistant cup-shaped porous monolayer matrix disposed between inner and outer cover layers.

FIG. 4 shows in partial cross-section an exemplary cup-shaped disposable personal respirator 400. Respirator 400 includes inner cover web 402, monocomponent filtration layer 404, and outer cover layer 406. Welded edge 408 holds these layers together and provides a face seal region to reduce leakage past the edge of respirator 400. Leakage may be further reduced by pliable dead-soft nose band 410 of for example a metal such as aluminum or a plastic such polypropylene. Respirator 400 also includes adjustable head and neck straps 412 fastened using tabs 414, and exhalation valve 416. Aside from the monocomponent filtration layer 404, further details regarding the construction of respirator 400 will be familiar to those skilled in the art.

When used to make a molded respirator (e.g., like the monocomponent filtration layer 404 shown in FIG. 4), the disclosed molded matrix preferably has a King Stiffness greater than 1 N and preferably at least about 2 N or more. As a rough approximation, if a hemispherical molded matrix sample is allowed to cool, placed cup-side down on a rigid surface, depressed vertically (viz., dented) using an index finger and then the pressure released, a matrix with insufficient King Stiffness may tend to remain dented and a matrix with adequate King Stiffness may tend to spring back to its original hemispherical configuration. A molded respirator may also or instead be evaluated by measuring Deformation Resistance (DR), using a Model TA-XT2i/5 Texture Analyzer (from Texture Technologies Corp.) equipped with a 25.4 mm diameter polycarbonate test probe. The molded matrix is placed facial side down on the Texture Analyzer stage. Deformation Resistance DR is measured by advancing the polycarbonate probe downward at 10 mm/sec against the center of the molded test matrix over a distance of 25 mm. Using five molded test matrix samples, the maximum (peak) force is recorded and averaged to establish Deformation Resistance DR. Deformation Resistance DR preferably is at least about 75 g and more preferably at least about 200 g. We are not aware of a formula for converting King Stiffness values to Deformation Resistance values, but can observe that the Deformation Resistance test may be used to evaluate low stiffness molded matrices that may be below the threshold measurement values in the King Stiffness test. When exposed to a 0.075 μm sodium chloride aerosol flowing at 85 liters/min, the disclosed molded respirator preferably has a pressure drop less than 20 mm $H_2O$ and more preferably less than 10 mm $H_2O$. When so evaluated, the molded respirator also preferably has a % NaCl penetration less than about 5%, and more preferably less than about 1%. When evaluated at a 13.8 cm/sec face velocity and using an NaCl challenge, the flat web from which such a molded matrix may be formed preferably has an initial filtration quality factor QF of at least about 0.4 $mm^{-1} H_2O$ and more preferably at least about 0.5 $mm^{-1} H_2O$.

Figure 5:
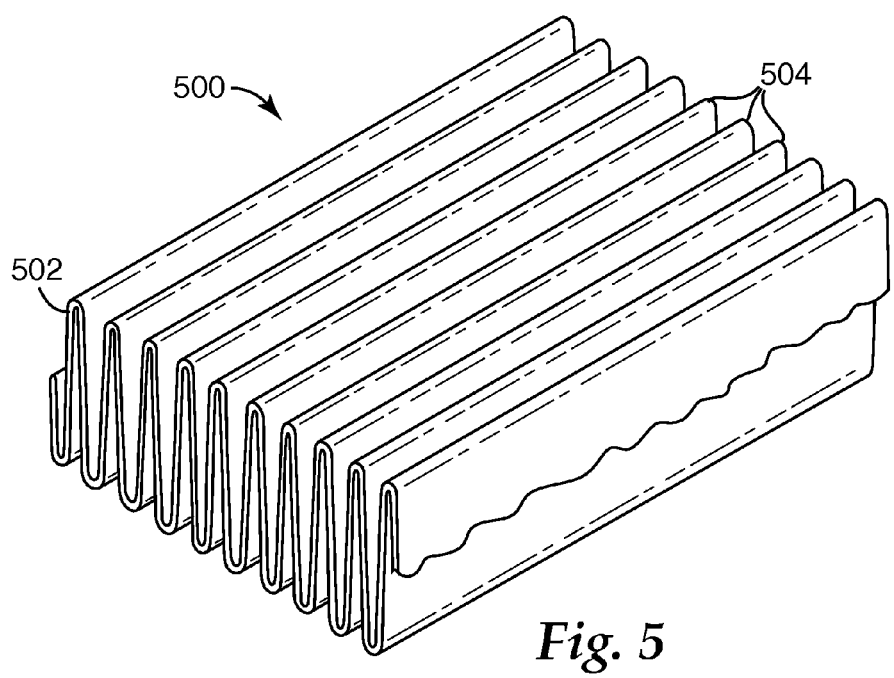
FIG. 5 is a perspective view of pleated filtration media.

FIG. 5 shows in perspective view an exemplary pleated filter 500 made from the disclosed monocomponent filtration layer 502 which has been formed into rows of spaced pleats 504. Persons having ordinary skill in the art will appreciate that filter 500 may be used as is or may be reinforced with a suitable support (e.g., an expanded metal screen) and optionally mounted in a suitable frame (e.g., a metal or cardboard frame) to provide a replaceable filter for use in e.g., HVAC systems. The increased stiffness of pleated filter 500 (arising from the presence of the larger diameter fibers in the disclosed monocomponent filtration layer) is believed to contribute to increased resistance of pleated filter 500 to pleat deformation at high filter face velocities. Aside from the monocomponent filtration layer 502, further details regarding the construction of filter 500 will be familiar to those skilled in the art.

When used to make a pleated filter (e.g., like the monocomponent filtration layer 502 shown in FIG. 5), the disclosed web preferably has a Gurley Stiffness before pleating of at least about 100 mg, and may have a Gurley Stiffness before pleating of at least about 200 mg or at least about 300 mg. When exposed to a 0.185 μm diameter DOP particle aerosol flowing at 85 liters/min at an airborne concentration of about 100 mg/m³, the disclosed pleated filter preferably has an average initial sub-micron efficiency of at least about 15% at a 1.52 meters/sec (300 ft/min) face velocity, and may have an average initial sub-micron efficiency of at least about 25% or at least about 50%. When evaluated at a 13.8 cm/sec face velocity using such a DOP challenge, the flat web from which such a pleated filter may be formed preferably has an initial filtration quality factor QF of at least about 0.3, and more preferably at least about 0.4.

The disclosed nonwoven webs may be formed into molded respirators, pleated filters and other finished articles using methods and additional elements that will be familiar to those having ordinary skill in the art. When forming three-dimensional shapes it may be desirable to monitor flat web properties such as basis weight, web thickness, solidity, EFD, Gurley Stiffness, Taber Stiffness, pressure drop, initial % NaCl penetration, % DOP penetration or the Quality Factor QF before shaping, and to monitor shaped (e.g., molded or pleated) matrix properties such as King Stiffness, Deformation Resistance DR, pressure drop or average initial submicron efficiency after shaping. For example, molding properties may be evaluated by forming a test cup-shaped matrix between mating male and female halves of a hemispherical mold having a 55 mm radius and a 310 cm³ volume.

EFD may be determined (unless otherwise specified) using an air flow rate of 32 L/min (corresponding to a face velocity of 5.3 cm/sec), using the method set forth in Davies, C. N., "The Separation of Airborne Dust and Particles", Institution of Mechanical Engineers, London, Proceedings 1B, 1952.

Gurley Stiffness may be determined using a Model 4171E GURLEY™ Bending Resistance Tester from Gurley Precision Instruments. Rectangular 3.8 cm×5.1 cm rectangles are die cut from the webs with the sample long side aligned with the web transverse (cross-web) direction. The samples are loaded into the Bending Resistance Tester with the sample long side in the web holding clamp. The samples are flexed in both directions, viz., with the test arm pressed against the first major sample face and then against the second major sample face, and the average of the two measurements is recorded as the stiffness in milligrams. The test is treated as a destructive test and if further measurements are needed fresh samples are employed.

Taber Stiffness may be determined using a Model 150-B TABER™ stiffness tester (commercially available from Taber Industries). Square 3.8 cm×3.8 cm sections are carefully vivisected from the webs using a sharp razor blade to prevent fiber fusion, and evaluated to determine their stiffness in the machine and transverse directions using 3 to 4 samples and a 15° sample deflection.

Percent penetration, pressure drop and the filtration Quality Factor QF may be determined using a challenge aerosol containing NaCl or DOP particles, delivered (unless otherwise indicated) at a flow rate of 85 liters/min, and evaluated using a TSI™ Model 8130 high-speed automated filter tester (commercially available from TSI Inc.). For NaCl testing, the particles may generated from a 2% NaCl solution to provide an aerosol containing particles with a diameter of about 0.075 μm at an airborne concentration of about 16-23 mg/m³, and the Automated Filter Tester may be operated with both the heater and particle neutralizer on. For DOP testing, the aerosol may contain particles with a diameter of about 0.185 μm at a concentration of about 100 mg/m³, and the Automated Filter Tester may be operated with both the heater and particle neutralizer off. The samples may be exposed to the maximum NaCl or DOP particle penetration at a 13.8 cm/sec face velocity for flat web samples or an 85 liters/min flowrate for a molded or shaped matrix before halting the test. Calibrated photometers may be employed at the filter inlet and outlet to measure the particle concentration and the % particle penetration through the filter. An MKS pressure transducer (commercially available from MKS Instruments) may be employed to measure pressure drop (ΔP, mm H₂O) through the filter.

The equation:

$$QF = \frac{-\ln\left(\frac{\% \text{ Particle Penetration}}{100}\right)}{\Delta P}$$

may be used to calculate QF. Parameters which may be measured or calculated for the chosen challenge aerosol include initial particle penetration, initial pressure drop, initial Quality Factor QF, maximum particle penetration, pressure drop at maximum penetration, and the milligrams of particle loading at maximum penetration (the total weight challenge to the filter up to the time of maximum penetration). The initial Quality Factor QF value usually provides a reliable indicator of overall performance, with higher initial QF values indicating better filtration performance and lower initial QF values indicating reduced filtration performance.

King Stiffness may be determined using a King Stiffness Tester from J. A. King & Co., Greensboro, N.C. to push a flat-faced, 2.54 cm diameter by 8.1 m long probe against a molded cup-shaped respirator prepared by forming a test cup-shaped matrix between mating male and female halves of a hemispherical mold having a 55 mm radius and a 310 cm³ volume. The molded matrices are placed under the tester probe for evaluation after first being allowed to cool.

Average initial submicron efficiency may be determined by installing a framed filter into a test duct and subjecting the filter to potassium chloride particles which have been dried and charge-neutralized. A test face velocity of 300 ft/min (1.52 meters/sec) may be employed. An optical particle counter may be used to measure the concentration of particles upstream and downstream from the test filter over a series of twelve particle size ranges or channels. The particle size ranges in each channel are taken from ASHRAE standard 52.2 ("Method of Testing General Ventilation Air-Cleaning Devices for Removal Efficiency by Particle Size"). The equation:

$$\text{Capture efficiency (\%)} = \frac{\text{upstream particle count} - \text{downstream particle count}}{\text{upstream particle count}} \times 100$$

may be used to determine capture efficiency for each channel. The capture efficiency values for each of the four submicron channels (viz., particle diameters of 0.3 to 0.4 μm, 0.4 to 0.55 μm, 0.55 to 0.7 μm and 0.7 to 1.0 μm) may be averaged to obtain a single value for "average initial sub-micron efficiency". The test velocity, efficiency and pressure drop results are usually all reported.

The disclosed nonwoven webs may be used for a variety of molded respirator shapes. The disclosed nonwoven webs may also be used for a variety of filter configurations including HVAC (e.g., furnace) filters, vehicle cabin filters, clean room filters, humidifier filters, dehumidifier filters, room air purifier filters, hard disk drive filters and other flat or pleatable supported or self-supporting filtration articles. The disclosed nonwoven webs may if desired include one or more additional layers other than the disclosed monocomponent web. For example, molded respirators may employ inner or outer cover layers for comfort or aesthetic purposes and not for filtration or stiffening. Also, one or more porous layers containing sorbent particles may be employed to capture vapors of interest, such as the porous layers described in U.S. patent application Ser. No. 11/431,152 filed May 8, 2006 and entitled PARTICLE-CONTAINING FIBROUS WEB. Other layers (including stiffening layers or stiffening elements) may be included if desired even though not required to provide a shaped monolayer matrix with adequate stiffness for an intended application. The disclosed nonwoven webs may also be used for applications other than air filtration, e.g., for liquid (e.g., medical) filters, thermal insulation, acoustic insulation, packaging materials, shoe components including uppers, sole components and inserts, and for apparel including outerwear, activewear, and hazardous material garments.

The invention is further illustrated in the following illustrative examples, in which all parts and percentages are by weight unless otherwise indicated.

EXAMPLE 1

Using an apparatus like that shown in FIG. 2 and FIG. 3 and procedures like those described in Wente, Van A. "superfine Thermoplastic Fiber", Industrial and Engineering Chemistry, vol. 48. No. 8, 1956, pp 1342-1346 and Naval Research Laboratory Report 111437, Apr. 15, 1954, a meltblown monocomponent monolayer web was formed from larger fibers and smaller size fibers of the same polymeric composition. The larger size fibers were formed using TOTAL 3960 polypropylene (a 350 melt flow rate polymer) to which had been added 0.8% CHIMASSORB 944 hindered amine light stabilizer as an electret charging additive and 1% POLYONE™ No. CC10054018WE blue pigment from PolyOne Corp. to aid in assessing the distribution of larger size fibers in the web. The resulting blue polymer blend was fed to a Model 20 DAVIS STANDARD™ 2 in. (50.8 mm) single screw extruder from the Davis Standard Division of Crompton & Knowles Corp. The extruder had a 60 in. (152 cm) length and a 30/1 length/diameter ratio. The smaller size fibers were formed using EXXON PP3746 polypropylene (a 1475 melt flow rate polymer) available from Exxon Mobil Corporation to which had been added 0.8% CHIMASSORB 944 hindered amine light stabilizer. This latter polymer was white in color and was fed to a KILLION™ 0.75 in. (19 mm) single screw extruder from the Davis Standard Division of Crompton & Knowles Corp. Using 10 cc/rev ZENITH™ melt pumps from Zenith Pumps, the flow of each polymer was metered to separate die cavities in a 20 in. (50.8 cm) wide drilled orifice meltblowing die employing 0.015 in. (0.38 mm) diameter orifices at a spacing of 25 holes/in. (10 holes/cm) with alternating orifices being fed by each die cavity. Heated air attenuated the fibers at the die tip. The airknife employed a 0.010 in. (0.25 mm) positive set back and a 0.030 in. (0.76 mm) air gap. A moderate vacuum was pulled through a medium mesh collector screen at the point of web formation. The polymer output rate from the extruders was 1.0 lbs/in/hr (0.18 kg/cm/hr), the DCD (die-to-collector distance) was 22.5 in. (57.2 cm) and the collector speed was adjusted as needed to provide webs with a 208 gsm basis weight. A 20 µm target EFD was achieved by changing the extrusion flow rates, extrusion temperatures and pressure of the heated air as needed. By adjusting the polymer rate from each extruder a web with 75% larger size fibers and 25% smaller size fibers was produced. The web was hydrocharged with distilled water according to the technique taught in U.S. Pat. No. 5,496,507 (Angadjivand et al. '507) and allowed to dry. Set out below in Table 1A are the Run Number, basis weight, EFD, web thickness, initial pressure drop, initial NaCl penetration and Quality Factor QF for the flat web at a 13.8 cm/sec face velocity:

TABLE 1A

| Run No. | Basis Wt., gsm | EFD, µm | Thickness, mm | Pressure Drop, mm $H_2O$ | Initial Penetration, % | Quality Factor, 1/mm $H_2O$ |
|---|---|---|---|---|---|---|
| 1-1F | 208 | 20.3 | 4.49 | 2.9 | 4.1 | 1.10 |

The Table 1A web was next molded to form a cup-shaped molded matrix for use as a personal respirator. The top mold was heated to about 235° F. (113° C.), the bottom mold was heated to about 240° F. (116° C.), a mold gap of 0.020 in. (0.51 mm) was employed and the web was left in the mold for about 6 seconds. Upon removal from the mold, the matrix retained its molded shape. Set out below in Table 1B are the Run Number, King Stiffness, initial pressure drop, initial NaCl penetration and maximum loading penetration for the molded matrix.

TABLE 1B

| Run No. | King Stiffness, N | Pressure Drop, mm $H_2O$ | Initial Penetration, % | Maximum Loading Penetration, % |
|---|---|---|---|---|
| 1-1M | 1.33 | 5.2 | 6.5 | 17.1 |

The data in Table 1B shows that the molded matrix had appreciable stiffness.

EXAMPLE 2

Example 1 was repeated without using the electret charging additive in either the larger size or smaller size fibers. The web was plasma charged according to the technique taught in U.S. Pat. No. 6,660,210 (Jones et al.) and then hydrocharged with distilled water according to the technique taught in U.S. Pat. No. 5,496,507 (Angadjivand et al. '507) and allowed to dry. Set out below in Table 2A are the Run Number, basis weight, EFD, web thickness, initial pressure drop, initial NaCl penetration and Quality Factor QF for the flat web at a 13.8 cm/sec face velocity:

TABLE 2A

| Run No. | Basis Wt., gsm | EFD, µm | Thickness, mm | Pressure Drop, mm $H_2O$ | Initial Penetration, % | Quality Factor, 1/mm $H_2O$ |
|---|---|---|---|---|---|---|
| 2-1F | 204 | 13.4 | 4.92 | 5.2 | 1.9 | 0.76 |

The Table 2A web was next molded according to the method of Example 1. Upon removal from the mold, the matrix retained its molded shape. Set out below in Table 2B are the Run Number, King Stiffness, initial pressure drop, initial NaCl penetration and maximum loading penetration for the molded matrix.

TABLE 2B

| Run No. | King Stiffness, N | Pressure Drop, mm $H_2O$ | Initial Penetration, % | Maximum Loading Penetration, % |
|---|---|---|---|---|
| 2-1M | 1.47 | 8.6 | 1.95 | 3.67 |

The data in Table 2B shows that this molded matrix provides a monocomponent, monolayer filtration layer which passes the N95 NaCl loading test of 42 C.F.R. Part 84.

EXAMPLE 3

Using the method of Example 1, a monocomponent monolayer web was formed. The larger size fibers were formed using TOTAL 3868 polypropylene (a 37 melt flow rate polymer) to which had been added 0.8% CHIMASSORB 944 hindered amine light stabilizer from Ciba Specialty Chemicals as an electret charging additive and 2% POLYONE™ No. CC10054018WE blue pigment. The smaller size fibers were formed using EXXON PP3746G polypropylene to which had been added 0.8% CHIMASSORB 944 hindered amine light stabilizer. The polymer output rate from the extruders was 1.5 lbs/in/hr (0.27 kg/cm/hr), the DCD (die-to-collector distance) was 13.5 in. (34.3 cm) and the polymer rate from each extruder was adjusted to provide a web with 65% larger size fibers and 35% smaller size fibers. The web was hydrocharged with distilled water according to the technique taught in U.S. Pat. No. 5,496,507 (Angadjivand et al. '507) and allowed to dry. Set out below in Table 3A are the Run Number, basis weight, EFD, web thickness, initial pressure drop, initial NaCl penetration and Quality Factor QF for the flat web at a 13.8 cm/sec face velocity:

TABLE 3A

| Run No. | Basis Wt., gsm | EFD, μm | Thickness, mm | Pressure Drop, mm $H_2O$ | Initial Penetration, % | Quality Factor, 1/mm $H_2O$ |
|---|---|---|---|---|---|---|
| 3-1F | 226 | 15.1 | 3.76 | 3.8 | 1.3 | 1.06 |

The Table 3A web was next molded to form a cup-shaped molded matrix for use as a personal respirator. The top and bottom of the mold were both heated to about 230° F. (110° C.), a mold gap of 0.040 in. (1.02 mm) was employed and the web was left in the mold for about 9 seconds. Upon removal from the mold, the matrix retained its molded shape. Set out below in Table 3B are the Run Number, King Stiffness, initial pressure drop, initial NaCl penetration and maximum loading penetration for the molded matrix.

TABLE 3B

| Run No. | King Stiffness, N | Pressure Drop, mm $H_2O$ | Initial Penetration, % | Maximum Loading Penetration, % |
|---|---|---|---|---|
| 3-1M | 2.88 | 3.4 | 0.053 | 2.26 |

Figure 6:
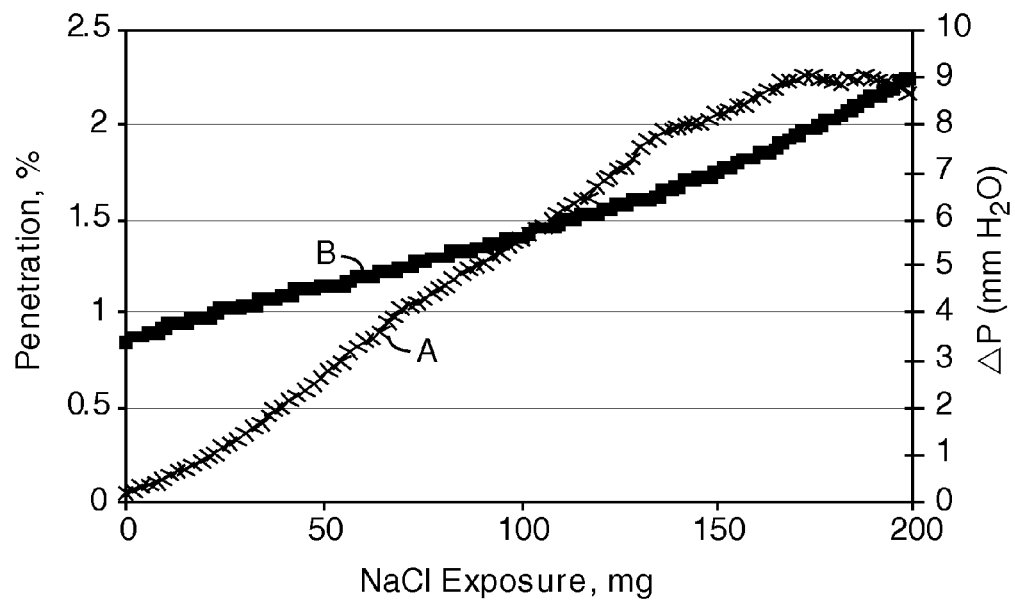
FIG. 6 is a graph showing % NaCl penetration and pressure drop for the molded respirator of Run No. 3-1M
Figure 7:
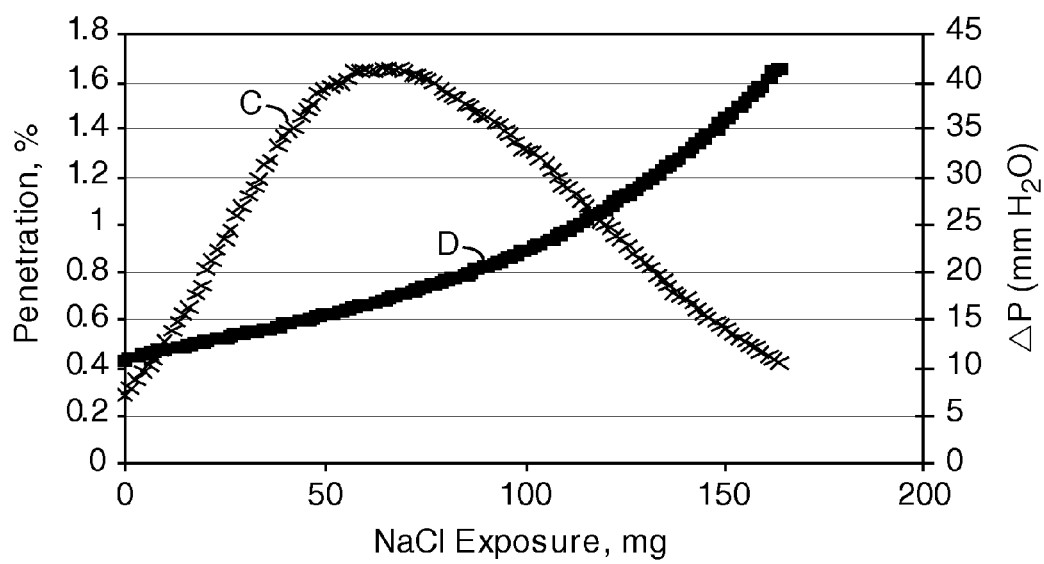
FIG. 7 is a similar graph for a commercial N95 respirator made from multilayer filtration media.

FIG. 6 is a graph showing % NaCl penetration and pressure drop for the molded respirator of Run No. 3-1M and FIG. 7 is a similar graph for a commercial N95 respirator made from multilayer filtration media. Curves A and B respectively are the % NaCl penetration and pressure drop results for the Run No. 13-1M respirator, and Curves C and D respectively are the % NaCl penetration and pressure drop results for the commercial respirator. FIG. 6 and the data in Table 3B show that the molded matrix of Run No. 3-1M provides a monocomponent, monolayer filtration layer which passes the N95 NaCl loading test of 42 C.F.R. Part 84, and which may offer longer filter life than the commercial respirator.

Figure 8:
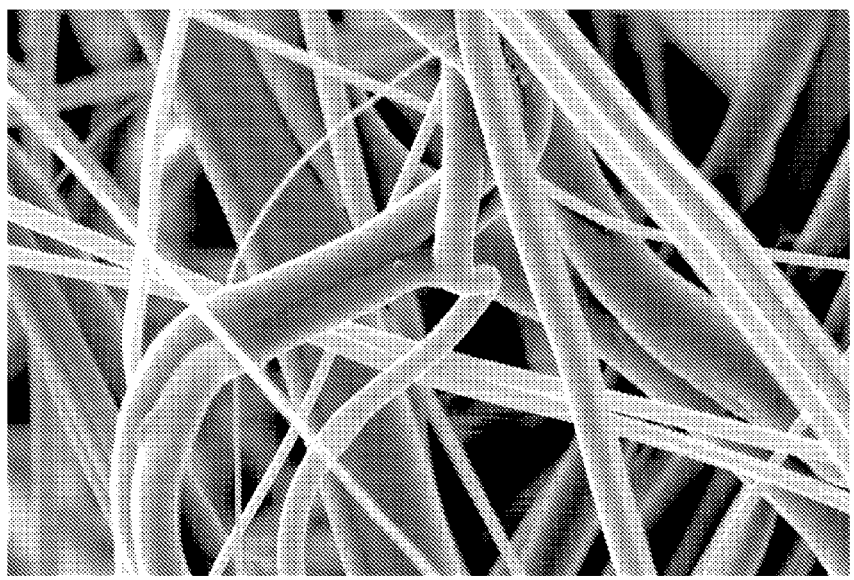
FIG. 8 and FIG. 9 respectively are a photomicrograph of and a histogram of fiber count (frequency) vs. fiber size in µm for the Run No. 3-1M molded matrix.
Figure 9:
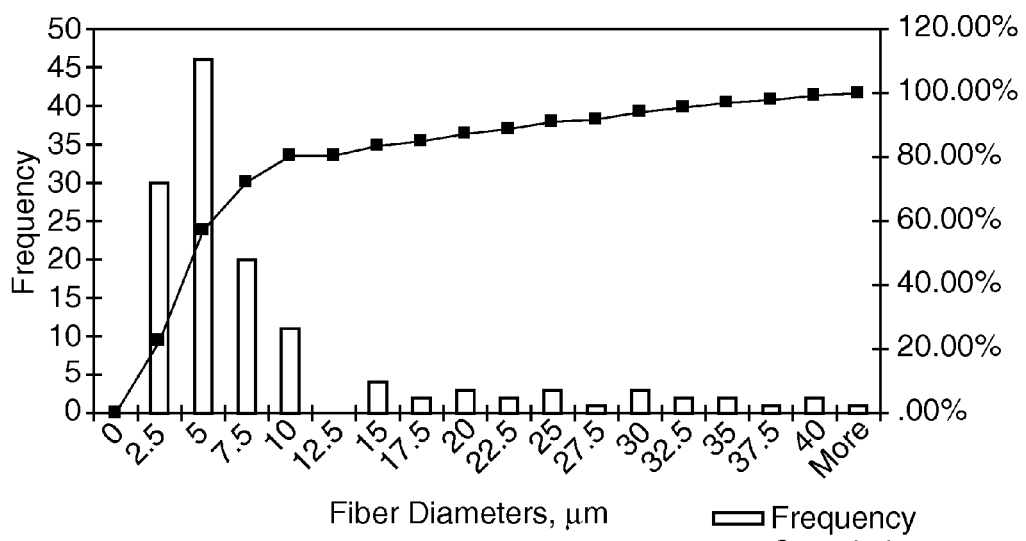

FIG. 8 and FIG. 9 respectively are a photomicrograph of and a histogram of fiber count (frequency) vs. fiber size in μm for the Run No. 3-1M molded matrix. Set out below in Table 3C is a summary of the fiber size distribution counts, and set out below in Table 3D is a summary of fiber size statistics for the Run No. 3-1M molded matrix.

TABLE 3C

| Size, μm | Frequency | Cumulative % |
|---|---|---|
| 0 | 0 | .00% |
| 2.5 | 30 | 22.56% |
| 5 | 46 | 57.14% |
| 7.5 | 20 | 72.18% |
| 10 | 11 | 80.45% |
| 12.5 | 0 | 80.45% |
| 15 | 4 | 83.46% |
| 17.5 | 2 | 84.96% |
| 20 | 3 | 87.22% |
| 22.5 | 2 | 88.72% |
| 25 | 3 | 90.98% |
| 27.5 | 1 | 91.73% |
| 30 | 3 | 93.98% |
| 32.5 | 2 | 95.49% |
| 35 | 2 | 96.99% |
| 37.5 | 1 | 97.74% |
| 40 | 2 | 99.25% |
| More | 1 | 100.00% |

TABLE 3D

| Statistic | Value, μm |
|---|---|
| Average Fiber Diameter, μm | 8.27 |
| Standard Deviation Fiber Diameter, μm | 9.56 |
| Min Fiber Diameter, μm | 0.51 |
| Max Fiber Diameter, μm | 46.40 |
| Median Fiber Diameter, μm | 4.57 |
| Mode, μm | 2.17 |
| Fiber Count | 133 |

FIG. 8 shows that the matrix fibers are bonded to one another at least some points of fiber intersection. FIG. 9 and the data in Table 3C show that the mixture of larger size fibers and smaller size fibers was polymodal, with at least three local modes.

EXAMPLE 4

The Example 1 web was formed into a pleated filter element with a pleat height of 20 mm and a pleat spacing of 11 mm. The pleats were stabilized by gluing an expanded wire screen to the pleat tips on both sides of the filter. The filter was framed with a one-piece chipboard frame having 0.5 in. (12.7 mm) flaps folded over the filter perimeter on both sides of the filter element. The open area of the filter was approximately 7.4×12.0 in. (188×305 mm). The filter element was tested for initial pressure drop and initial fractional efficiency at a 300 ft/min (1.52 m/sec) face velocity. The initial pressure drop was 0.831 in. (21.1 mm) $H_2O$. The results for the individual particle size ranges are shown below in Table 4A.

TABLE 4A

| Size Range, μm | Initial Fractional Efficiency, % |
|---|---|
| 0.3-0.4 | 92.0 |
| 0.4-0.55 | 95.6 |
| 0.55-0.7 | 98.1 |
| 0.7-1.0 | 99.1 |
| 1.0-1.3 | 99.6 |
| 1.3-1.6 | 99.7 |
| 1.6-2.2 | 99.8 |
| 2.2-3.0 | 99.9 |
| 3.0-4.0 | 99.9 |
| 4.0-5.5 | 100.0 |
| 5.5-7.0 | 100.0 |
| 7.0-10.0 | 100.0 |

The results in Table 4A show that the average initial submicron efficiency for this filter was 96.2%. The filter offered a desirable combination of low initial pressure drop and good capture efficiency.

A number of embodiments of the invention have been described. Nevertheless, it will be understood that various modifications may be made without departing from the invention. Accordingly, other embodiments are within the scope of the following claims.

The invention claimed is:

1. A method for making shaped filtration articles, which method comprises:
   a) forming a monocomponent nonwoven web by:
      i) flowing first and second fiber-forming materials of the same polymeric composition through a single melt-blowing die comprising first and second die cavities in respective fluid communication with first and second sets of orifices in a meltblowing die tip of the single melt-blowing die, wherein the first fiber-forming material flows at a lesser flow rate or viscosity through the first die cavity and first set of orifices to form a set of smaller size filaments and the second fiber-forming material flows at a greater flow rate or viscosity through the second die cavity and second set of orifices to form a set of larger size filaments;
      ii) commingling the smaller size and larger size filaments while attenuating them into fibers between converging streams of air or other fluid;
      iii) collecting the attenuated fibers as a nonwoven web containing a meltblown bimodal mass fraction/fiber size mixture of intermingled continuous microfibers and larger size fibers of the same polymeric composition, and
   b) molding, pleating or otherwise shaping the web into a self-supporting non-planar porous monocomponent monolayer matrix of fibers bonded to one another at least some points of fiber intersection.

2. A method according to claim 1 wherein the collected web has a histogram of mass fraction vs. fiber size in μm with a larger size fiber mode of about 10 to about 50 μm.

3. A method according to claim 1 wherein the collected web has a histogram of mass fraction vs. fiber size in μm with a larger size fiber mode of about 10 to about 40 μm.

4. A method according to claim 1 wherein the collected web has a histogram of mass fraction vs. fiber size in μm with a microfiber mode of about 1 to about 5 μm and a larger size fiber mode of about 12 to about 30 μm.

5. A method according to claim 1 wherein the collected web has a histogram of fiber count (frequency) vs. fiber size in μm with at least two modes whose corresponding fiber sizes differ by at least 50% of the smaller fiber size.

6. A method according to claim 1 wherein the collected web contains microfibers having a size of about 0.1 to about 10 μm and larger size fibers having a size of about 10 to about 70 μm.

7. A method according to claim 1 wherein the collected web contains microfibers having a size of about 0.1 to about 5 μm and larger size fibers having a size of about 15 to about 50 μm.

8. A method according to claim 1 wherein the microfibers provide at least 20% of the fibrous surface area of the web.

9. A method according to claim 1 wherein the microfibers provide at least 40% of the fibrous surface area of the web.

10. A method according to claim 1 wherein the collected web has a basis weight of about 80 to about 250 gsm.

11. A method according to claim 1 wherein the fiber-forming material is polypropylene.

12. A method according to claim 1 further comprising charging the web.

13. A method according to claim 12 comprising hydrocharging the web.

14. A method according to claim 12 comprising corona charging and hydrocharging the web.

15. A method according to claim 12 comprising plasma treating and hydrocharging the web.

16. A method according to claim 1 wherein the collected web has a Gurley Stiffness of at least about 100 mg before shaping.

17. A method according to claim 1 wherein the collected web has a Gurley Stiffness of at least about 200 mg before shaping.

18. A method according to claim 1 comprising molding the web to form a cup-shaped matrix having a King Stiffness greater than 1 N.

19. A method according to claim 1 comprising molding the web to form a cup-shaped matrix having a King Stiffness greater than 2 N.

20. A method according to claim 1 comprising pleating the web.

21. A method according to claim 1 wherein the first and second set of orifices are in a row.

* * * * *

UNITED STATES PATENT AND TRADEMARK OFFICE
CERTIFICATE OF CORRECTION

| | | |
|---|---|---|
| PATENT NO. | : 8,029,723 B2 | Page 1 of 1 |
| APPLICATION NO. | : 12/375494 | |
| DATED | : October 4, 2011 | |
| INVENTOR(S) | : Seyed Abol Hassan Angadjivand | |

It is certified that error appears in the above-identified patent and that said Letters Patent is hereby corrected as shown below:

Column 1
Line 26, delete "(Burgio)" and insert -- (Burgio), --, therefor.

Column 2
Line 22, delete "comingling" and insert -- commingling --, therefor.

Column 2
Line 32-33, delete "at least" and insert -- at at least --, therefor.

Column 2
Line 41, delete "comingling" and insert -- commingling --, therefor.

Column 10
Line 6, delete "flowrate" and insert -- flow rate --, therefor.

Column 14
Line 47 (Approx.), delete "at least" and insert -- at at least --, therefor.

Column 15
Line 51-52, In Claim 1, delete "at least" and insert -- at at least --, therefor.

Signed and Sealed this
Thirty-first Day of January, 2012

David J. Kappos
*Director of the United States Patent and Trademark Office*